US010282744B2

(12) United States Patent
Jaffe

(10) Patent No.: US 10,282,744 B2
(45) Date of Patent: May 7, 2019

(54) CONSUMER GROUP BUYING THROUGH ONLINE ADS

(75) Inventor: Howard Jaffe, Pacifica, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1335 days.

(21) Appl. No.: 12/915,436

(22) Filed: Oct. 29, 2010

(65) Prior Publication Data
US 2012/0109732 A1     May 3, 2012

(51) Int. Cl.
G06Q 30/00    (2012.01)
G06Q 30/02    (2012.01)
G06Q 30/06    (2012.01)

(52) U.S. Cl.
CPC ..... *G06Q 30/0224* (2013.01); *G06Q 30/0239* (2013.01); *G06Q 30/0241* (2013.01); *G06Q 30/0255* (2013.01); *G06Q 30/0261* (2013.01); *G06Q 30/0277* (2013.01); *G06Q 30/0601* (2013.01)

(58) Field of Classification Search
CPC .......... G06Q 30/0261; G06Q 30/0239; G06Q 30/0277
USPC ............... 705/14.58, 14.39, 14.73
See application file for complete search history.

(56) References Cited

U.S. PATENT DOCUMENTS

| | | | | |
|---|---|---|---|---|
| 6,631,356 B1 * | 10/2003 | Van Horn et al. | ........... | 705/26.2 |
| 8,140,402 B1 * | 3/2012 | Mesaros | ............ | G06Q 30/0222 705/26.1 |
| 2004/0262381 A1 * | 12/2004 | Mesaros | ............ | G06Q 30/0207 705/14.39 |
| 2005/0096980 A1 * | 5/2005 | Koningstein | .................... | 705/14 |
| 2005/0222989 A1 * | 10/2005 | Haveliwala et al. | ............. | 707/3 |
| 2006/0129454 A1 * | 6/2006 | Moon | .................... | G06Q 30/02 705/14.53 |
| 2009/0187463 A1 * | 7/2009 | DaCosta | ......................... | 705/14 |

(Continued)

FOREIGN PATENT DOCUMENTS

WO    WO-2006023499 A2 *   3/2006  ............. G06Q 30/02

OTHER PUBLICATIONS

Matsuo, Tokuro et al, "A Volume Discount-Based Allocation Mechanism in Group Buying", https://ieeexplore.ieee.org/stamp/stamp.jsp?arnumber=1517699, 2005. (Year: 2005).*

(Continued)

*Primary Examiner* — Michael Bekerman
(74) *Attorney, Agent, or Firm* — Brinks Gilson & Lione

(57) ABSTRACT

A system for presenting advertising materials including group sales offers within the context of a network-accessible document such as a Web page. One embodiment stores a plurality of ads, including some group sales offers. Fulfillment of each group sales offer is conditioned upon acceptance of the offer by a prescribed minimum number of viewers. The system receives a request for online content from a client computer operated by a viewer, where the requested online content is unrelated to group sales offers. Responsive to the request, the system selects a group sales offer from the plurality of ads based on the nature of the requested content and/or viewer characteristics or past behavior accumulated from past communications with the viewer. The system automatically delivers the selected group sales offer and the requested content to the client computer for display.

14 Claims, 8 Drawing Sheets

(56) References Cited

U.S. PATENT DOCUMENTS

2011/0213650 A1* 9/2011 Mesaros ............ G06Q 30/0217
                                                                   705/14.23
2012/0143656 A1* 6/2012 Murphy ............. G06Q 30/0207
                                                                   705/14.1

OTHER PUBLICATIONS

Kauffman, Robert, J., "Bid Together, Buy Together: On the Efficacy of Group-Buying Business Models in Internet-Based Selling", http://misrc.umn.edu/workingpapers/fullpapers/2001/0110_051601.pdf, May 16, 2001. (Year: 2001).*

Chen, Jian, "Comparison of the group-buying auction and the fixed pricing mechanism", Decision Support Systems, vol. 43, pp. 445-459, Dec. 29, 2006. (Year: 2006).*

* cited by examiner

100

```
Welcome to Y!GangUp. – Get tons of purchases – day 1!

Company Name, Address, Dunns #, payment information, invoice
information, phone number(s), point of contact, username,
password, email address.
```

FIG. 5

```
Welcome to Y!GangUp. – Get tons of purchases – day 1!

Login: (Username, password)

Min/Max Units Available _____

Product description (Short)    _____

Product description (Long)    _____
   _____

Upload Graphic: (Browse...)

Deal start day/time _____ and duration _____

Geographic territory: _____

Target Description  (Age-Range), (Gender), (time of day), typically
interests and hobbies of people interested in this deal.
```

FIG. 6

```
Requested Username _____

Requested Password _____

Credit-card: _____  Exp Date ___ ___

First name, Last Name _____ _____

Address _____

Put check-box next to your interests below....
```

FIG. 7

Dining & Nightlife (check all)

| ☐ Bar & Club | ☐ Restaurants |
|---|---|

Health & Beauty (check all)

| ☐ Massage | ☐ Facial | ☐ Manicure / Pedicure |
|---|---|---|
| ☐ Tanning | ☐ Hair Salon | ☐ Hair Removal |
| ☐ Spa | ☐ Teeth Whitening | ☐ Eye & Vision |
| ☐ Barber Shop | ☐ Makeup | |

Fitness (check all)

| ☐ Pilates | ☐ Yoga | ☐ Gym |
|---|---|---|
| ☐ Boot Camp | | |

Retail & Services (check all)

| ☐ Men's Clothing | ☐ Women's Clothing | ☐ Food & Grocery |
|---|---|---|
| ☐ Treats | ☐ Home Services | ☐ Rental Car |

Activities & Adventures (check all)

| ☐ Museums | ☐ Wine Tasting | ☐ City Tours |
|---|---|---|
| ☐ Comedy Clubs | ☐ Theater | ☐ Concerts |
| ☐ Life Skills Classes | ☐ Golf | ☐ Go Cart Racing |
| ☐ Bowling | ☐ Sporting Events | ☐ Skydiving |
| ☐ Skiing | ☐ Dance Classes | |

FIG. 8

Your Purchase Reservation

Description          Quantity    Price    Total

Oil Change              1        $10  =  $10

Select Payment Method

Pay with existing Card    Card Number

*    Visa              ****4343            Edit Card

CLICK HERE TO COMPLETE ORDER  (Cancel)

FIG. 9

APPROVE _____

REJECT _____

COMMENTS _____

Min/Max Units Available _____

Product description (Short) _____

Product description (Long) _____

_____

Upload Graphic (Browse...)

Deal start day/time _____ and duration _____

Geographic territory: _____

Target Description (Age-Range), (Gender), (time of day), typically interests and hobbies of people interested in this deal.

FIG. 10

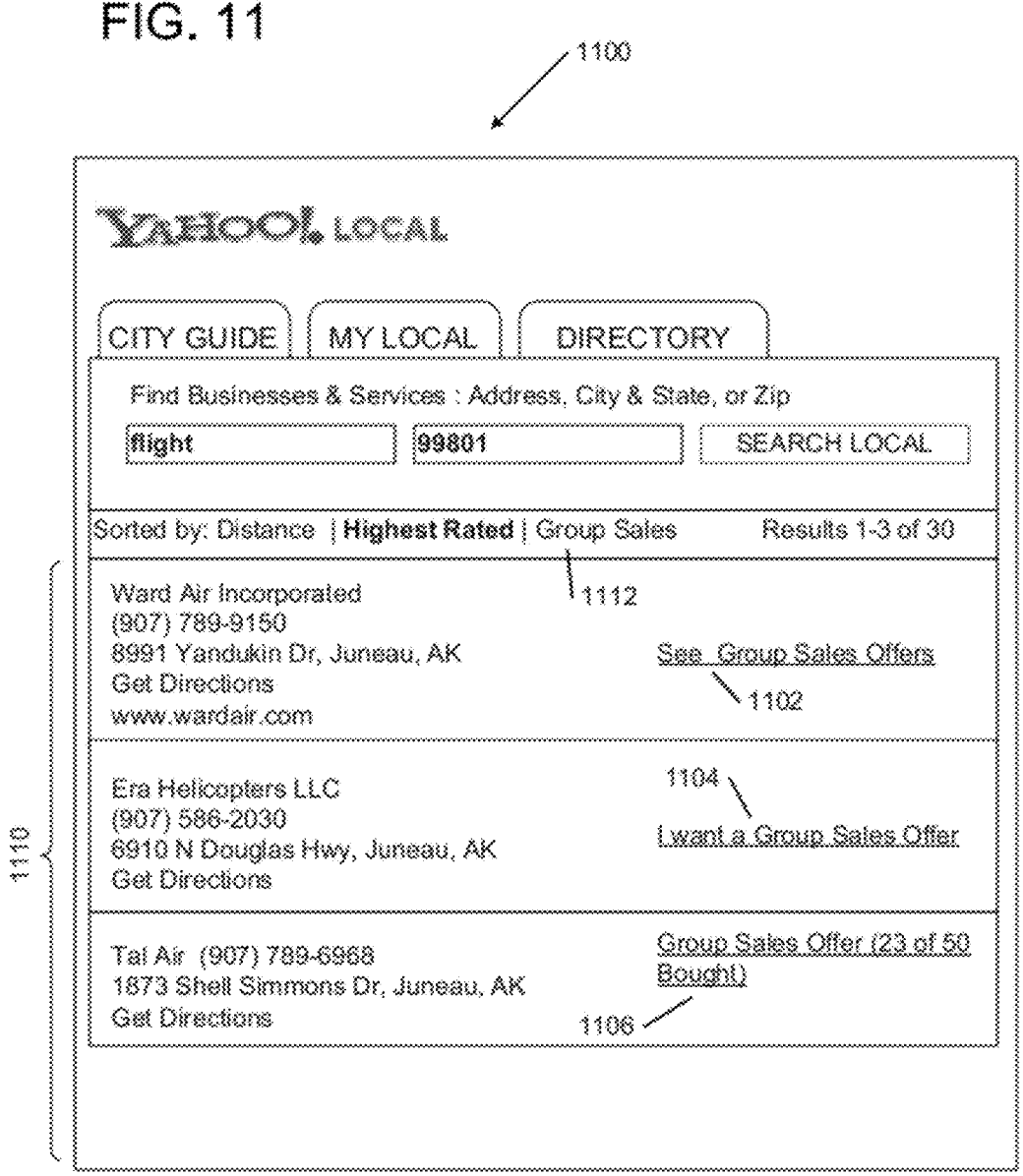

CONSUMER GROUP BUYING THROUGH ONLINE ADS

BACKGROUND OF THE INVENTION

Field of the Invention

The present invention generally relates to systems and methods for delivering advertising materials for presentation within the context of a network-accessible document such as a Web page.

Background

The popularity of "group buying" Web sites has been skyrocketing. The basic premise is that a large group agrees to buy a particular item, the seller can afford to mark down the selling price, and all buyers reap a significant discount.

Typically, a group buying Web site publishes various offers to sell different items such as products or services. The items of each offer are marked down from normal prices. Each offer is contingent upon acceptance by a minimum number of people, which is stated in the published offer. People can indicate their acceptance of the contingent offer by interacting with an interface provided by the group buying Web site. When the specified number of people accept an offer, this forms a deal, and the seller becomes obligated to provide the offered item at the price pre-announced in the offer. In many cases, the group buying Web site will issue a coupon to each person that accepted the offer, where the coupon is redeemable at the seller to receive the benefit of the published deal.

One hypothetical example is an offer to sell an ocean kayaking class from Auke Bay Adventure Kayaking for $50, where the class is normally priced at $125. The offer requires thirty participants to accept. A group buying Web site publishes the offer directly on their Web site, or by distributing emails describing the offer. Thousands of people view the offer via Web site or email, and during this time, interested parties accept the offer using a "buy" button or other graphical user interface (GUI) feature provided in the Web site or email. The group buying Web site continually tallies the total number of acceptances, and provides an updated count via the Web site. When the number of acceptances reaches thirty, the offer may be closed, or it may continue for some time while others can still join in. When the offer closes, the group buying Web site issues coupons to the buyers, each coupon good for the right to purchase the Auke Bay Adventure Kayaking class for $50 instead of the normal $125. Email is one way in which the group buying Web site may distribute the coupons.

Group buying Web sites make money through fees collected from the sellers for publishing their sales offers as well as through certain revenue-sharing arrangements whereby the buyers' payments are shared in part by the Web site proprietor and the seller. To increase profits, group buying Web sites are always interested in gaining more customers. However, the challenge of attracting customers to a Web page and obtaining greater user engagement with the content displayed thereon is an age old problem that continually confronts Web site operators and advertisers. Offering more striking deals is one way to attract more customers, but to attract such deals there is no substitute for having a massive body of customers that visit or subscribe to the group buying Web site. So, the problem is circular.

In many respects, known group buying Web sites may be satisfactory to their advertising customers and buyers. Nevertheless, group buying Websites are like other businesses in that there is an ever present desire to pursue company growth to satisfy investors and achieve success, and in this respect, some heretofore unknown improvements are still needed.

BRIEF SUMMARY OF THE INVENTION

A system is disclosed for presenting advertising materials including group sales offers within the context of a network-accessible document such as a Web page. One embodiment stores a plurality of ads, including some group sales offers. Fulfillment of each group sales offer is conditioned upon acceptance of the offer by a prescribed minimum number of viewers. The system receives a request for online content from a client computer operated by a viewer, where the requested online content is unrelated to group sales offers. Responsive to the request, the system selects a group sales offer from the plurality of ads based on the nature of the requested content and/or viewer characteristics or past behavior accumulated from prior communications with the viewer. The system automatically delivers the selected group sales offer and the requested content to the client computer for display.

This system may be implemented in the form of an apparatus, method, circuit, digital data storage device, or a combination thereof.

Further features and advantages of the invention, as well as the structure and operation of various embodiments of the invention, are described in detail below with reference to the accompanying drawings. The invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 4-10 depict the contents of various documents provided to client or advertiser computers in connection with group sales offers in accordance with various embodiments of the invention.

FIG. 11 is an exemplary screenshot depicting a listing of local products and services, where the listing incorporates various group sales features according to one embodiment of the invention.

Figure 1:
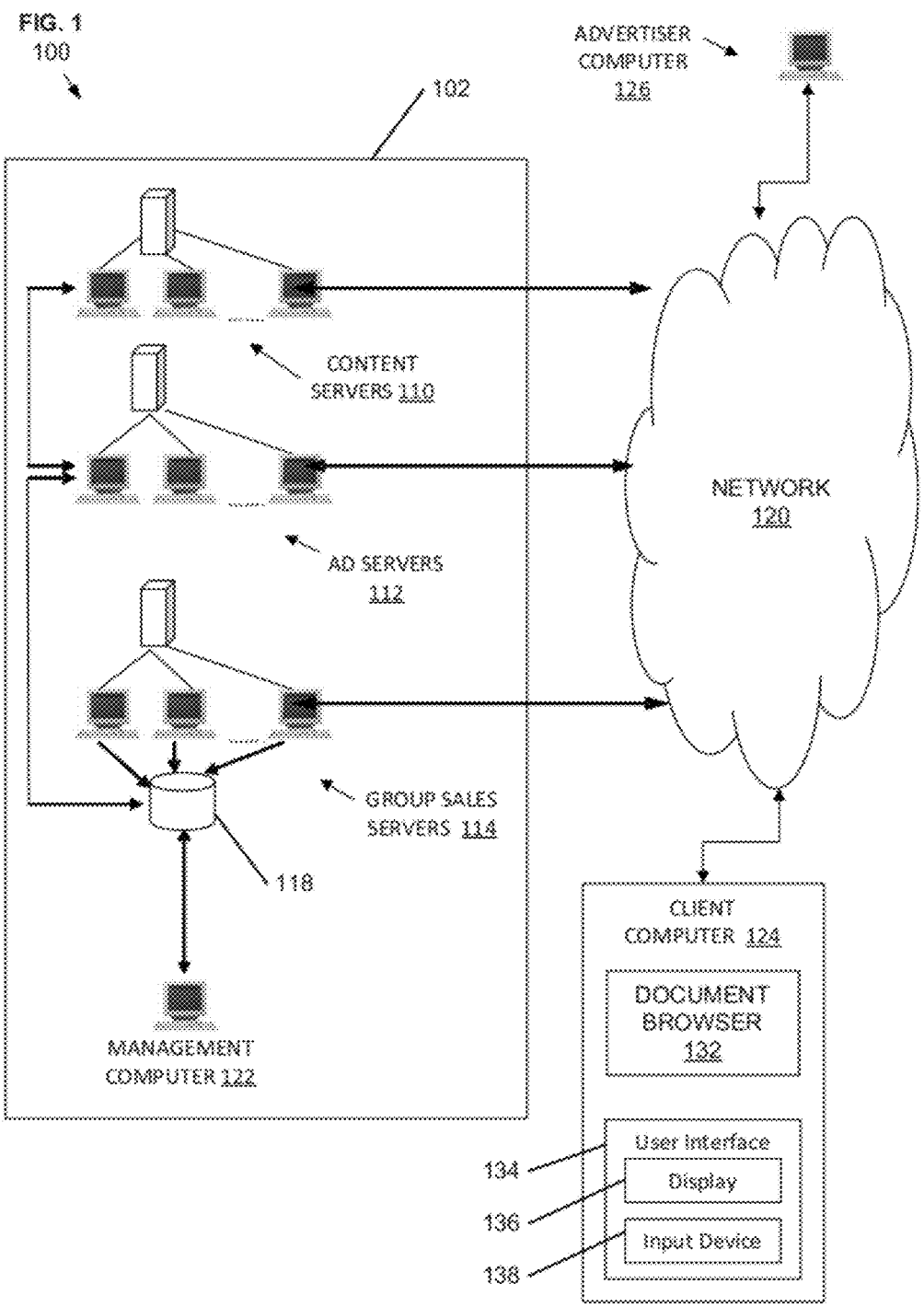
FIG. 1 is a block diagram of a system for serving online advertisements, including group sales offers, to client computers in accordance with one embodiment of the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an

DETAILED DESCRIPTION OF THE INVENTION

1. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

2. Example System for Serving of Online Advertisements Including Group Sales Offers

A. Introduction

FIG. 1 is a high-level block diagram of an exemplary system 100 for serving online advertisements ("ads") that include group sales offers to client computers in accordance with an embodiment of the present invention. As shown in FIG. 1, system 100 includes an online service provider system 102, an advertiser computer 126, and a client computer 124. Each of these components is communicatively connected to a network 120. In the illustrated embodiment, network 120 comprises a wide area network such as the Internet. However, the invention is not so limited and network 120 may comprise any type of network or combination of networks including wide area networks, local area networks, personal area networks, private networks, public networks, packet networks, and circuit-switched networks. Each network included within network 120 may be implemented over wired and/or wireless communication mediums.

B. Client Computer

Client computer 124 includes a document browser 132 and a user interface 134. Document browser 132 comprises logic that is configured to access remote servers over network 120 for the purpose of retrieving user-viewable documents and presenting such documents to a user via user interface 134. User interface 134 includes at least a display 136 by which a user may view such documents and an input device 138 for allowing the user to selectively retrieve the user-viewable documents and optionally interact with elements displayed within such documents. Input device 138 may comprise, for example, a mouse or other pointing device, a keyboard, keypad, touch screen, or the like.

In one embodiment, document browser 132 comprises a software-implemented Web browser that is executed by one or more processors or processor cores within client computer 124 and the documents retrieved over network 120 comprise Web pages. The Web browser may comprise, for example, any commercially-available or publicly-available Web browser, including but not limited to Internet Explorer® (published by Microsoft Corporation of Redmond, Wash.), Mozilla® Firefox® (published by Mozilla Corporation of Mountain View, Calif.), or Safari® (published by Apple Computer of Cupertino, Calif.). However, these are examples only and are not intended to be limiting. In accordance with such an implementation, client computer 124 may comprise any system or device that is capable of executing a Web browser. For example, client computer 124 may comprise a desktop computer, laptop computer, tablet computer, gaming console, personal digital assistant, cellular telephone, portable media player or the like.

C. Online Service Provider System

Online service provider system 102 stores and delivers various online content and ads to client computers such as client computer 124. As will be appreciated by persons skilled in the relevant art(s), any of a wide variety of entities may own and/or operate system 102. In one embodiment, a content aggregator, such as Yahoo! Inc. of Sunnyvale Calif., owns and operates system 102 for the purpose of publishing Web pages that include various types of information that may be of interest to viewers.

System 102 includes content servers 110, which comprise computers that are configured to publish documents for retrieval by client computers such as client computer 124 via network 120. The documents published by content servers 110 may comprise Web pages, although the invention is not so limited. Content servers 110 may include subcomponents (not shown) such as a document assembler and a document server, as are known in the art and described in various published documents.

Some non-limiting examples of content that may be provided by system 102, and in particular by content servers 110, include news articles, sports scores and articles, search engine functionality, financial reports and articles, horoscopes, games, shopping, listings of local businesses, videos, weather, social networking, and the like. Examples of these and additional types of online content are available from content aggregators such as Yahoo! Inc. of Sunnyvale Calif., which owns and operates system 102 in the present example.

Ad servers 112 comprise computers that are configured to provide online ads for inclusion within documents served by content servers 110. Some examples of the ads delivered by the servers 112 include banner ads, pop-up ads, and the like. Ad servers 112 may be owned and/or operated by the same entity that owns and/or operates content servers 110 or by some other entity, such as an advertiser or third-party ad serving company. In one embodiment, separate systems may serve online content and advertisements including group sales offers. For example, a publisher of online content may serve online content, and insert advertisements from ad servers and group sales servers that are distinct from the publisher.

In one embodiment, ad servers 112 provide various interfaces accessible to an advertiser operating an advertising computer 126, by which the advertiser may create or otherwise submit online ads. Some examples of these interfaces include, but are not limited to, interactive online interfaces made available to advertiser computer 126 by a Web application running on one of ad servers 112.

Group sales servers 114 are computers that are configured to provide online ads referred to herein as group sales offers. These may interchangeably referred to as group sales ads, without any intended limitation. The nature, operation, and use of group sales offers are described in greater detail herein. In one embodiment, group sales servers 114 provide various interfaces by which advertisers may create or submit group sales offers via advertising computers such as advertiser computer 126. These interfaces may include, but are not limited to, interactive online interfaces made available to advertiser computer 126 by a Web application running on one of group sales servers 114.

Group sales servers 114 may also provide various interfaces accessible to viewers for the purpose of interacting with group sales offers using client computers such as client computer 124. For example, these interfaces may include, but are not limited to, interactive online interfaces made available to client computers 124 by a Web application running on one of group sales servers 114.

Although system 102 may employ many different items (not shown) of digital data storage, FIG. 1 illustrates a particular instance 118 of digital data storage related to group sales servers 114. In one embodiment, digital data storage 118 stores group sales offers, metadata related to group sales offers, statistics regarding the receipt, entry, terms, operation, viewer acceptance, and success of group sales offers. Digital data storage 118 may further store data related to the management of group sales offers, as appropriate to the details of the intended application.

Management computer 122, coupled to digital data storage 118, provides an interface for inputting, amending, removing, and managing group sales offers as well as various other functions described in greater detail herein. Management computer 122 may be implemented by a notebook computer, PC, workstation, mainframe computer, or any other digital data processing machine with sufficient power and resources to carry out the functions described herein.

D. Advertiser Computer

As mentioned above, advertisers employ advertiser computer 126 to submit and monitor advertisements submitted to online service provider system 102, and conduct related communications with system 102. Advertiser computer 126 may be implemented by a notebook computer, PC, workstation, mainframe computer, mobile device, or any other digital data processing machine with sufficient power and resources to carry out the functions described herein. Management computer 122 may or may not be coupled to network 120, depending upon the particular implementation.

3. Example Digital Data Processor

Figure 2:
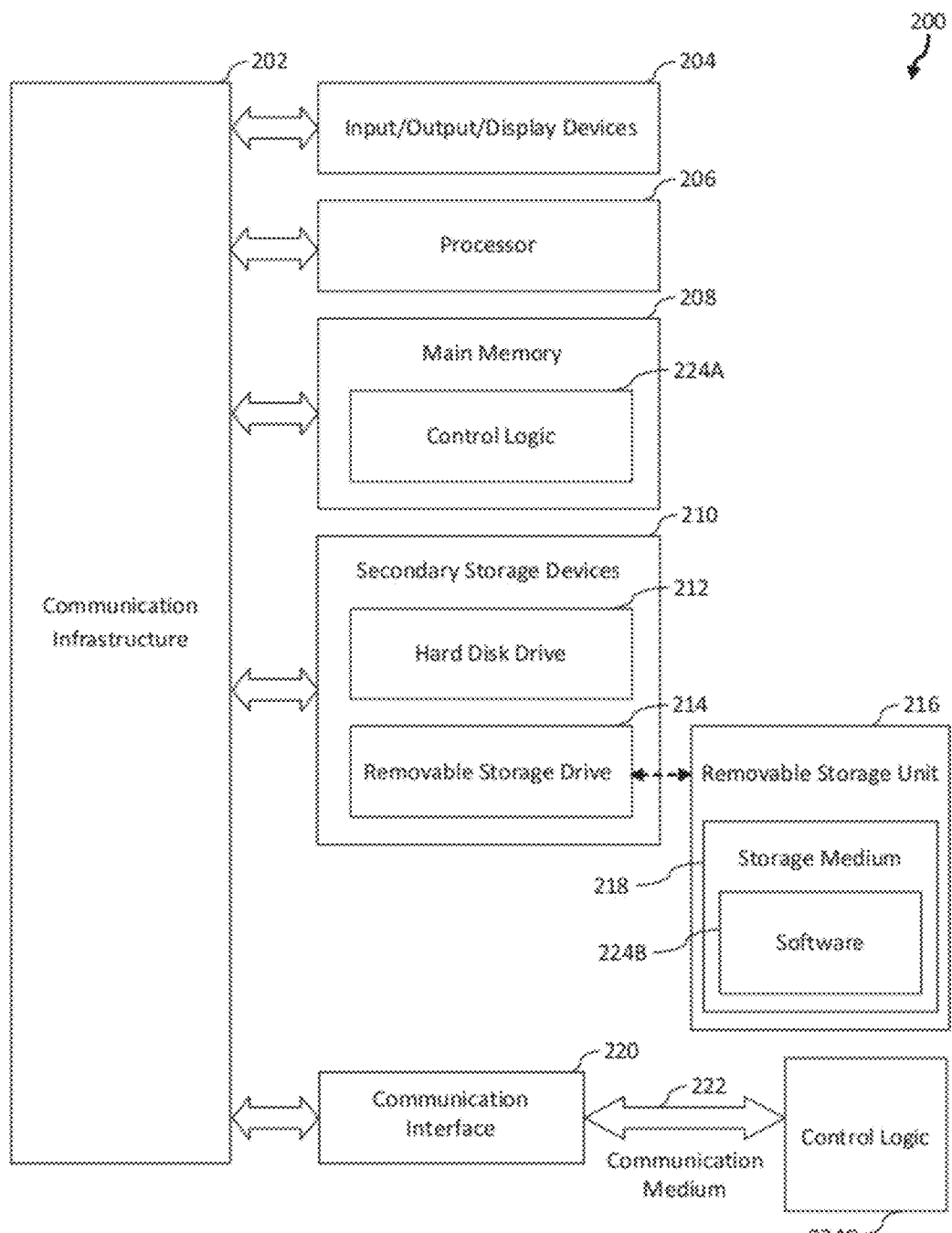
FIG. 2 is a block diagram of an example computer system that may be used to implement aspects of the invention.

The embodiments described herein, including systems, methods/processes, and/or apparatuses, may be implemented using well known servers/computers, such as computer 200 shown in FIG. 2. For instance, elements of example system 100, including any of content servers 110, any of ad servers 112, any of group sales servers 114, management computer 112, advertiser computer 112, and client computer 124 depicted in FIG. 1 and elements thereof, and each of the steps of flowchart 300 depicted in FIG. 3 may each be implemented using one or more computers 200.

Computer 200 can be any commercially available and well known computer capable of performing the functions described herein, such as computers available from International Business Machines, Apple, Sun, HP, Dell, Cray, etc. Computer 200 may be any type of computer, including a desktop computer, a server, etc. Computer 200 may also comprise other types of processor-based devices including but not limited to mobile computing devices.

As shown in FIG. 2, computer 200 includes one or more processors (e.g., central processing units (CPUs)), such as processor 206. Processor 206 may comprise one or more of the following: a microprocessor, controller, microcontroller, state machine, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Processor 206 is connected to a communication infrastructure 202, such as a communication bus. In some embodiments, processor 206 can simultaneously operate multiple computing threads.

Computer 200 also includes a primary or main memory 208, such as a random access memory (RAM). Main memory has stored therein control logic 224A (computer software), and data.

Computer 200 also includes one or more secondary storage devices 210. Secondary storage devices 210 include, for example, a hard disk drive 212 and/or a removable storage device or drive 214, as well as other types of storage devices, such as memory cards and memory sticks. For instance, computer 200 may include an industry standard interface, such as a universal serial bus (USB) interface for interfacing with devices such as a memory stick. Removable storage drive 214 represents a floppy disk drive, a magnetic tape drive, a compact disk drive, an optical storage device, tape backup, etc.

Removable storage drive 214 interacts with a removable storage unit 216. Removable storage unit 216 includes a computer useable or readable storage medium 218 having stored therein computer software 224B (control logic) and/or data. Removable storage unit 216 represents a floppy disk, magnetic tape, compact disc (CD), digital versatile disc (DVD), Blue-ray disc, optical storage disk, memory stick, memory card, or any other computer data storage device. Removable storage drive 214 reads from and/or writes to removable storage unit 216 in a well known manner Computer 200 also includes input/output/display devices 204, such as monitors, keyboards, pointing devices, etc.

Computer 200 further includes a communication or network interface 220. Communication interface 220 enables computer 200 to communicate with remote devices. For example, communication interface 220 allows computer 200 to communicate over communication networks or mediums 222 (representing a form of a computer useable or readable medium), such as local area networks (LANs), wide area networks (WANs), the Internet, etc. Network interface 220 may interface with remote sites or networks via wired or wireless connections. Examples of communication interface 222 include but are not limited to a modem, a network interface card (e.g., an Ethernet card), a communication port, a Personal Computer Memory Card International Association (PCMCIA) card, etc.

Control logic 224C may be transmitted to and from computer 200 via the communication medium 222.

Any apparatus or manufacture comprising a computer useable or readable medium having control logic (software) stored therein is referred to herein as a computer program product or program storage device. This includes, but is not limited to, computer 200, main memory 208, secondary storage devices 210, and removable storage unit 216. Such computer program products, having control logic stored therein that, when executed by one or more data processing devices, cause such data processing devices to operate as described herein, represent embodiments of the invention.

Figure 3:
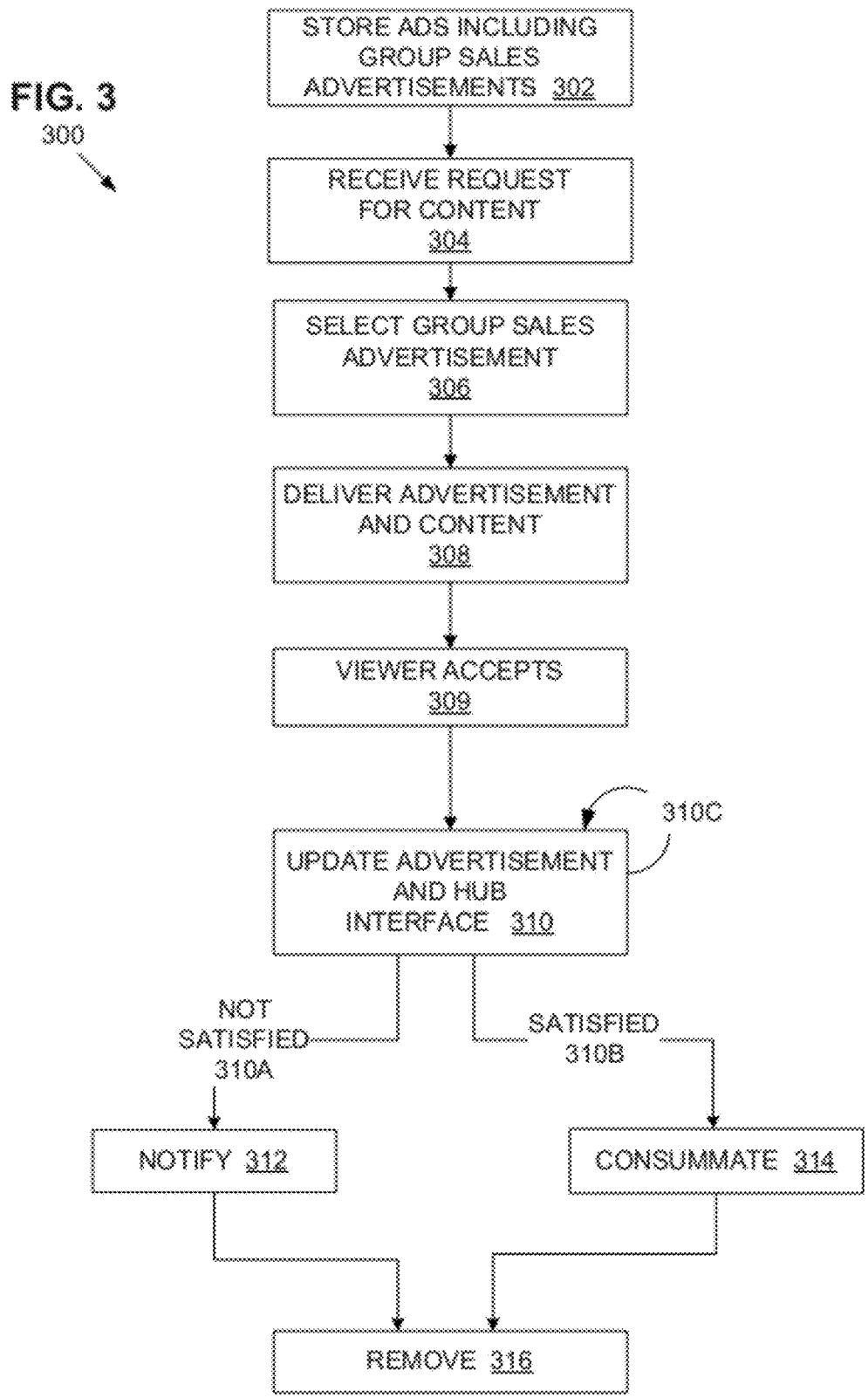
FIG. 3 depicts a flowchart of a method for delivering online content and group sales offers in accordance with one embodiment of the invention.

For example, elements of example system 100, including any of content servers 110, any of ad servers 112, any of group sales servers 114, management computer 112, advertiser computer 112, and client computer 124 depicted in FIG. 1 and elements thereof, and each of the steps of flowchart 300 depicted in FIG. 3 can each be implemented as control logic that may be stored on a computer useable medium or computer readable medium, which can be executed by one or more processors to operate as described herein.

4. Example Methods for Serving Online Ads that include Group Sales Offers

A. Introduction

Having described the structural features of one embodiment of the present invention, some operational aspects are now described. FIG. 3 depicts a flowchart 300 of a method for managing and serving group sales offers to viewers over a network in accordance with an embodiment. The method of flowchart 300 will now be described with continued reference to system 100 of FIG. 1, although the method is not limited to that implementation.

For purposes of explanation, the following discussion describes the performance of specific functions by specific components 110, 112, 114 and 122 of system 100, wherein the functions involve receiving, storing, selecting, and serving ads. Such description is provided by way of example only, however, and no limitation is intended. For example, in contrast to the description provided herein, there may be a separate coordinator computer (not shown) to receive communications from outside system 102 and issue appropriate routing and instructions to selected components 110, 112, 114.

Prior to the performance of the method of flowchart 300, viewers and advertisers may pre-register to sponsor future group sales offers. Alternatively, viewers may register upon acceptance of their first group sales offer, and advertisers may register upon their first submission of a group sales offer to system 102. At any rate, pre-registration for group sales offers is managed by a component of system 102 such as the group sales servers 114. For viewers, pre-registration may include placing a credit card on file with group sales servers 114 or another component of system 102 and optionally establishing preferences for receiving and participating in future group sales offers. For viewers that have already purchased items or conducted prior financial transactions via system 102, system 102 may use data from these prior transactions in lieu of pre-registration.

FIGS. 7 and 8 show some exemplary viewer registration interfaces that servers 114 or another component of system 102 provide to users newly registering to participate in group sales offers. The interface of FIG. 7, for example, solicits information identifying the viewer, so that the viewer can accept future group sales offers (as explained below) using a username and servers 114 or another component of system 102 will know who the viewer is. The interface FIG. 7 also includes credit card information, so that the viewer can more conveniently accept group sales offers without entering the payment data each time, and so that servers 114 or another component of system 102 can automatically debit the viewer when a group sales offer concludes in the viewer's favor. The interface of FIG. 8 solicits an expression of various interests of the viewer so that servers 114 can tailor the presentation of future group sales offers to the viewer, as explained in greater detail below.

For advertisers, pre-registration is carried out using advertiser computer 126 to interact with ad servers 112 or group sales servers 114, and involves setting up an account with an appropriate component of system 102. Setting up an account may involve establishing invoice and payment information and the like. FIG. 5 shows an exemplary advertiser pre-registration interface that servers 114 or another component of system 102 provides to newly registering advertisers. The interface of FIG. 5 solicits information identifying the advertiser, providing payment, supplying contact data, and the like. Personnel or equipment affiliated with system 102 may use this data, for example, to manually or automatically collect data on the advertiser, such as gathering financial reports or verifying forms of payment, prior to accepting ads from them. Contact data is helpful to streamline acceptance by servers 114 of future group sales offers from the advertiser.

B. Receiving and Storing Ads

In step 302, system 102 stores various ads. These include ads that do not include group sales offers, which are referred to herein as "traditional" ads and stored at ad servers 112. The ads stored in step 302 also include group sales offers stored by group sales servers 114. The traditional and group sales offers stored in step 302 may be received from advertisers via computers such as advertiser computer 126, received via management computer 122, or received from another applicable source.

In the present example, advertisers submit group sales offers to group sales servers 114 or another component of system 102 using a deal submission interface. FIG. 6 shows an example of a deal submission interface that servers 114 may provide to receive advertisers' deal submissions. The interface of FIG. 6 solicits sufficient information to identify the advertiser and the details and limitations of the proposed group sales offer. In addition, the interface of FIG. 6 may solicit data on the advertiser's target audience, such as age, gender, time of day, and other demographics, which are useful in targeting so that servers 114 or another component of system 102 can tailor this group sales offer to the most appropriate viewers as explained in greater detail below.

Each group sales offer submitted to system 102 may include information such as the following: (1) product/service deal to be shown to targeted viewers, (2) minimum number of viewers that need to opt into the deal for the deal to happen, (3) maximum number of purchases that can occur, (4) amount per transaction that will be paid to the operator of system 102 and the vendor, (5) duration of the deal, (6) geographic scope, and (7) target description, such as "males, age 22-36, between 6 pm and 9 pm, with a demonstrated interest in sports bars."

Each group sales offers pertains to a product or service or other item, the nature of which is only limited by the creativity of advertisers, the applicable laws, and the policies of system 102. Some examples include restaurant meals, food items, tours, roller coaster rides, surfboard rentals, circus tickets, massages, haircuts, and the like. The product or service of a group sales offer, in one example, may be a package of online advertising from system 102 or another entity. For example, a group sales offer may provide that if one hundred viewers accept, then each viewer is entitled to pay a specified price for an online advertisement of a given size and running for a specified duration.

The terms of each group sales offer specify that fulfillment of the group sales offer is conditioned upon acceptance of the offer by a prescribed minimum number of viewers, specified by the sponsoring advertiser. To help illustrate, an exemplary group sales offer is described. One hypothetical example is an offer to sell a guided fly fishing trip from Bear Creek Outfitters for $250, where the trip is normally priced at $400. The offer is conditioned upon acceptance by fifteen participants. The seller is Bear Creek Outfitters, and the offer may be submitted by the seller or a marketing firm, advertising company, or other entity.

Group sales offer submissions are reviewed automatically by servers 114 or another component of system 102 or by hand, and approved offers are made available to group sales servers 114. FIG. 10 shows one example of a review interface that management computer 122 may provide for personnel associated with system 102 to use in reviewing submitted group sales offers. The interface of FIG. 10 solicits information such as the details and limitations of the group sales offer, as well as the disposition of the offer as approved or rejected. This helps streamline and standardize the entry of approved group sales offers into the group sales servers 114.

In one embodiment, the group sales offers are stored in a logical ad inventory that also includes traditional ads served by ad servers 112. Each group sales offer specifies a starting time and optionally an ending time, and when the starting time arrives for a given group sales offer, group sales servers 114 add a notation to the inventory that the given group sales offer is "live," thereby making the given group sales offer available for delivery to viewers. In one example, this is accomplished by placing the given group sales offer in an "active inventory" of group sales offers. Group sales offers of the active inventory are amenable to being delivered to client computers, and may actually be delivered to client computers depending upon the mechanism for choosing group sales offers as discussed in greater detail below.

Figure 4:
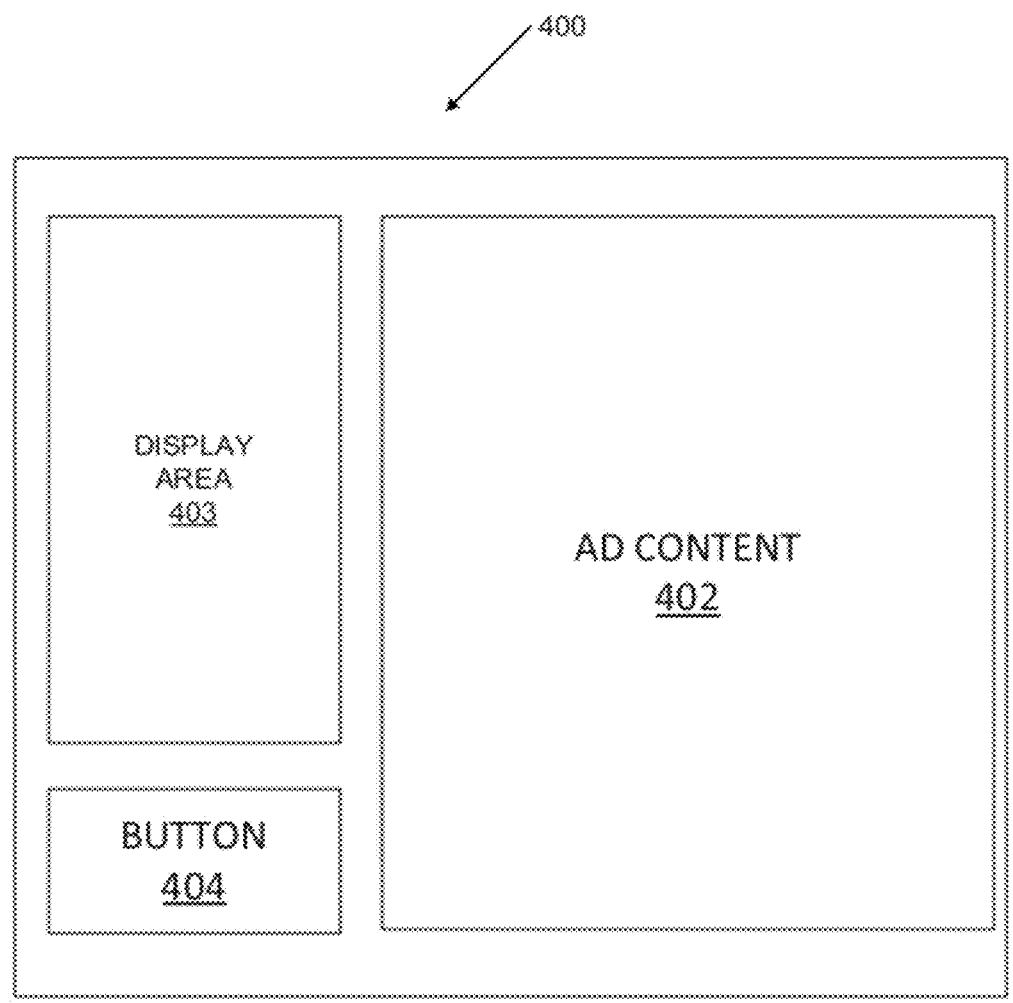

In addition to the terms of the current group sales offer, step 302 stores components of an online ad describing the current group sales offer, for future display to client computers. FIG. 4 shows one example 400 of such an online ad, which is described in greater detail below. The online ad may be provided by an advertiser or it may be generated by a component of system 102.

Depending upon the desired implementation, such an online ad may include text as well as one or more static images, animation, and/or multimedia content such as video content. When the group sales offer ad comprises an animation and/or multimedia content, document browsers such as document browser 132 may utilize a "plug-in" software module in order to present the animation and/or multimedia content. Such plug-in software modules may include for example a Java™ plug-in made available by Sun Microsystems™ of Santa Clara, Calif., an Adobe® Flash® or Shockwave® plug-in made available by Adobe Systems Inc. of San Jose, Calif., or a Microsoft® Silverlight™ plug-in made available by Microsoft Corporation of Redmond, Wash. The online ad describing the group sales offer may also comprise one or more interactive elements such as hyperlinks.

Under various circumstances, system 102 prunes the active inventory of group sales offers. For instance, group sales servers 114 may remove a given group sales offer from the active inventory responsive to receiving acceptance of the given group sales offer from a prescribed minimum number of viewers. In another example, group sales servers 114 may remove a given group sales offer from the active inventory when a specified minimum number of deliveries to viewers have been completed. In another example, group sales servers 114 may prune an offer from the active inventor whenever a predetermined, advertiser-specified expiration time arrives without the offer being accepted by a prescribed minimum number of viewers.

C. Receiving Request for Content

In step 304, system 102 receives a request for online content from client computer 124. In the illustrated example, system 102 routes the request for content to content servers 110 to be carried out. In one example, the request for content represents a viewer request to view documents or access online services of the types specifically described above, and hosted by content servers 110. For example, the request for content may be a request to view stock prices or other financial data, read news stories, execute a search, engage in social networking, play online games, and the like. The requested content is independent of advertising materials automatically delivered to viewers' document browsers, such as ads from ad servers 112 or group sales offers from group sales servers 114.

D. Selecting Group Sales Offer

In step 306, system 102 selects an ad for delivery to the viewer whose request was received in step 304. In this operation, system 102 may select one of the traditional ads served by ad servers 112, or one of the group sales offers served by group sales servers 114, or a combination of both. This depends upon the desired implementation of ad targeting mechanism implemented by system 102.

In the current example, the selection of step 306 includes the selection of a group sales offer by group sales servers 114. Group sales servers 114 select the current group sales offer based upon one or more predetermined considerations, which may vary according to the desired implementation of ad targeting mechanism. In one example, for selecting group sales offers for delivery to the viewer, group sales servers 114 may employ the same ad-to-viewer targeting system employed by ad servers 112 to select traditional ads for delivery to the viewer. There are many techniques known in the art for targeting online advertisements to viewers and any of these techniques may be used to select a particular group sales offers for delivery to a viewer.

In a more particular example, group sales servers 114 may select the current group sales offer according to (1) the nature of the content requested by the viewer, or (2) viewer characteristics or past behavior accumulated from prior communications with the viewer.

As for (1), this involves matching the selected subject matter of a group sales offer to the subject matter of the requested online content. For example, group sales servers 114 may select a group sales offer for a discounted package of bulk coffee at Raven's Brew Coffee in response to the viewer employing content servers 110 to conduct an Internet search for bulk coffee. As another example, group sales servers 114 may select a group sales offer for discounted movie tickets in response to the viewer requesting content servers 110 to deliver a document having to do generally with movies.

As for (2), selecting the current group sales offer based on viewer characteristics may consider information such as the viewer's age, gender, home city or state obtained from IP address or home address stated in a profile, current geographical location of a mobile device representing the client computer, likes and dislikes entered into a user profile, or any other characteristics of the viewer previously known or ascertainable by system 102. Past behavior accumulated from prior communications with the viewer also provides information useful in selecting a group sales offer, and may include data such as a viewer's history of invoking system 102 to purchase or conduct Internet searches for goods or services of a particular type, the viewer's history of clicking on banner ads, the viewer's history of viewing or engaging in group sales offers in the past, and the like.

Although the options (1) and (2) were described individually, group sales servers 114 may select the current group sales offer by implementing a union, intersection, or other combination of these strategies as well as ad-to-viewer targeting routines known for traditional ads.

E. Delivering Ad and Content

In step 308, responsive to the viewer's request for content from step 304, the group sales servers 114 deliver the selected group sales offer to the viewer, and content servers 110 deliver the requested content to the viewer.

FIG. 4 shows an exemplary online ad 400 that includes a group sales offer that may be delivered to client computer 124 during step 308. Online ad 400 includes ad content 402 explaining terms of the group sales offer, and a display area 403 that is automatically updated to show remaining time for the offer. Display area 403 may also show other information such as a minimum number of purchases required, and a current number of viewers that have accepted. A button 404 or other user interface feature is provided to receive a viewer's acceptance of the offer. In one embodiment, online ad 400 may also include a user interface feature (not shown) for viewers to forward the offer to others via social networking sites, email, sharing widget, or other tool. In one embodiment, online ad 400 may comprise a click-through banner prepared in advance by the advertiser or based on the terms of the group sales offer and instructions of the advertiser.

F. Receiving Acceptance

In step 309, servers 114 receive viewer acceptance of the delivered group sales offer. As mentioned above, button 404 of online ad 400 is one exemplary means by which the viewer can convey acceptance of the displayed group sales offer to servers 114. Upon receiving notification of viewer acceptance, groups sales servers 114 may notify the current viewer that an email will be sent when the current group sales offer closes, either successfully or otherwise. Also, at this time, group sales servers 114 may cause document browser 132 to stop displaying the group sales offer (e.g., stop displaying online ad 400), and group sales servers 114 may instead deliver a completion interface, an example of which is depicted in FIG. 9. The interface of FIG. 9 confirms the terms of the group sales offer, and solicits payment information if the viewer is not already pre-registered with servers 114 or system 102 in general. In one embodiment, server 114 may replace the completion interface of FIG. 9 with a new version of online ad 400, continually updated to reflect the current number of viewers that have opted-in so that the viewer can monitor progress of the group sales offer.

According to an optional embodiment, online ad 400 from FIG. 4 or the completion interface from FIG. 9 may provide a feature for the viewer to enter a time limit for the group sales offer to close. Thus, if a required number of viewers do not accept the group sales offer by the stated time, then the viewer's acceptance alone is automatically revoked.

G. Updating

In step 310, system 102 performs certain updates in response to acceptance of the offer by the present viewer and other viewers. For instance, group sales servers 114 may automatically update any ongoing and future displays of online ad 400 at viewer computers to depict the number of viewers that have presently accepted the offer. In an additional or alternative embodiment, group sales servers 114 may provide an interface (not shown) that provides a hub for all of the viewer's group sales offers. This interface may display, for instance, the status of active group sales offers, listing of closed group sales offers, and the like. The hub interface provides data so viewers can visually track and monitor deals they have accepted, and optionally additional deals they are interested in following out of general interest.

The updates of step 310 may be repeated on any desired periodic or event-driven basis as indicated by 310c.

In the embodiment described above, where the viewer has entered a time limit for the group sales offer to close, and the time limit has expired without the offer being accepted by the required minimum number of viewers, then step 310 causes document browser 132 to remove any currently-displayed online ad or interface showing status of the group sales offer, and step 310 also causes group sales servers 114 to update the viewer's hub interface accordingly.

H. Resolving Group Sales Offer

Paths 310a or 310b illustrate the resolution of the current group sales offer. If the advertiser-specified requirements of the group sales offer are met, such as acceptance by a sufficient number of viewers, then the group sales offer has been satisfied 310b.

In this event, servers 114 or management computer 122 or another component of system 102 transmits email or other electronic notification to the viewers that accepted the offer. Also, system 102 takes steps to facilitate consummation 314 of the transaction proposed by the current group sales offer. In one example, servers 114 or management computer 122 or another component of system 102 may conduct or facilitate an exchange of money for the products or services addressed by the current group sales offer. As to the viewers that accepted the offer, servers 114 or management computer 122 or another component of system 102 may issue a paper certificate or electronic code redeemable toward purchase of the products or services. In addition, or as an alternative, servers 114 or management computer 122 or another component of system 102 may transmit a machine-readable message to a vendor whose products are the subject of the current group sales offer, requesting that this vendor ship the specified goods. The vendor may automatically ship the goods without a need to communicate further with the buyers. Also as part of step 314, servers 114 or management computer 122 or another component of system 102 may debit the viewer's previously credit card entered upon registration, and transfer funds to the vendor.

In contrast to the foregoing description, if the current group sales offer is concluded 310a without success, then in step 312 servers 114 or another component of system 102 transmits notification 312 that the deal was not consummated, by sending emails, triggering pop-up messages, updating hub interfaces, or other means. These notifications are sent to the viewers and may further be sent to the applicable vendor or advertiser.

After either of steps 312, 314, servers 114 may remove 316 the current group sales offer from the active ad inventory. Alternatively, the group sales offer may remain in the active ad inventory, but when selecting group sales offers for delivery in future instances of step 306, server 114 or another component of system 102 may consider whether the offer has already been delivered to a particular viewer and if so, how many times.

I. Enhancements

The following describes some optional enhancements to the method of flowchart 300. In one example, content servers 110 or servers 114 or a combination of these components may incorporate data about group sales into content that resides offers outside online ad 400 and the hub interface.

FIG. 11 shows an interface 1100 that includes a listing 1110 of local products and services, as one example. Listing 1110 shows various vendors that satisfy a search of local businesses in a particular geographic location according to specific search terms. Different group sales features are illustrated near each entry of vendor listing 1110. As shown in FIG. 11, listing 1110 includes four different interface elements 1102, 1104, 1106, and 1112 related to group sales offers.

Interface elements 1102, 1104, and 1106 comprise underlined hyperlinks in this example, but icons, widgets, pop-ups, or other interface elements may be used without departing from the invention. Interface element 1102 is responsive to viewer activation to provide a summary of all active and/or past group sales offers by the listed vendor.

Interface element 1104 is responsive to viewer selection to send a machine-readable message to content server 110 or another component of system 102 that the viewer is interested in obtaining group sales offers from the listed company. As to interface element 1104, one embodiment provides that servers 114 or another component of system 102 automatically transmits a message relaying viewers' expressions of interest or accumulates viewers' expressions of interest and transmits them to the listed vendor when they reach a prescribed minimum number. In a further embodiment, personnel associated with system 102 may respond to a prescribed number of viewers activating interface elements such as 1104 by contacting the listed company and proposing or negotiating the terms of a group sales offer.

Interface element 1106 shows that a group sales offer is in progress for the listed company, and that twenty-three people have accepted, and a minimum number of fifty are required to satisfy the deal. Interface element 1106 is responsive to user activation to display further details about an active group sales offer, such as an explanation of the services involved in the offer and its terms.

Other examples of group sales features that may be provided in this context include a listing of total outstanding group sales offers for a listed company, and total of viewers' expressions of interest made via interface element 1104, and other such features. In a further option, interface 1100 provides an interface element 1112 to sort listings 1110 by group sales offer characteristics, such as total number of group sales offers, nearness to completion of a group sales offer, or other criteria.

5. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
    storing, at a memory device, data defining a group sales offer, where fulfillment of the group sales offer is conditioned upon acceptance of the group sales offer by a prescribed minimum number of buyers, and where the data defining the group sales offer includes geographic scope information associated with the group sales offer;
    receiving, at a processor communicatively coupled to the memory device, data defining a request for online content from a mobile device operated by a buyer;
    receiving, at the processor, data defining a current geographic location of the mobile device of the buyer from a global positioning system;
    selecting for transmission to the mobile device of the buyer, by the processor, the group sales offer based on a match between the current geographic location of the mobile device and the geographic scope information associated with the group sales offer, where the selection is in response to the receiving of the data defining a request for online content and the data defining a current geographic location of the mobile device;
    transmitting, by the processor, a first graphical user interface to the mobile device of the buyer, the first graphical user interface configured to display to the buyer the selected group sales offer, the first graphical user interface comprising a first user interface feature configured to receive, from the buyer, an acceptance of the group sales offer, and a second user interface feature configured to receive, from the buyer, a time limit for a prescribed minimum number of viewers to accept the group sales offer;
    transmitting, by the processor, a second graphical user interface to the mobile device of the buyer, the second graphical user interface visually depicting to the buyer a status of active group sales offers and closed group sales offers; and
    responsive to the prescribed minimum number of viewers not accepting the group sales offer by the time limit, automatically revoking, by the processor, the acceptance of the group sales offer by the buyer.

2. The method of claim 1:
    wherein the transmitting, by the processor, of the first graphical user interface is in response to the selection; and
    further comprising transmitting, by the processor, the requested online content to the mobile device, in response to the selection.

3. The method of claim 1, where the selection is further based on characteristics of online purchases previously conducted by the buyer.

4. The method of claim 1, comprising transmitting, by the processor, a third graphical user interface to the mobile device of the buyer, the third graphical user interface including solicitations for information regarding interests and demographics of the buyer.

5. The method of claim 1, comprising:
    transmitting, by the processor, a third graphical user interface to the mobile device of the buyer, the third graphical user interface configured to display to the buyer a solicitation for the buyer to express interest in a business associated with the selected group sales offer; and
    ranking, by the processor, the business according a count of received expressions of interest in the business relative to other businesses subject to inquiries by the third graphical user interface.

6. A system, comprising:
    a memory device configured to store processor executable instructions; and
    a processor communicatively coupled to the memory device, the processor configured to execute the instructions to:
        receive data defining a request for online content from a mobile device operated by a buyer;
        receive data defining a current geographic location of the mobile device of the buyer from a global positioning system;
        select for transmission to the mobile device of the buyer the online content and a group sales offer based on a match between the current geographic location of the mobile device and geographic scope information associated with the group sales offer, where fulfillment of the group sales offer is conditioned upon acceptance of the group sales offer by a prescribed minimum number of viewers;

transmit a first graphical user interface to the mobile device of the buyer, the first graphical user interface configured to display to the buyer the selected group sales offer, the first graphical user interface comprising a first user interface feature configured to receive, from the buyer, an acceptance of the group sales offer, and a second user interface feature configured to receive, from the buyer, a time limit for the prescribed minimum number of viewers to accept the group sales offer;

transmit a second graphical user interface to the mobile device of the buyer, the second graphical user interface visually depicting to the buyer a status of active group sales offers and closed group sales offers; and responsive to the prescribed minimum number of viewers not accepting the group sales offer by the time limit, automatically revoke the acceptance of the group sales offer by the buyer.

7. The system of claim 6, where the selection is also based on demographics of the buyer.

8. The system of claim 6, where the selection is also based on characteristics of online purchases previously conducted by the buyer.

9. The system of claim 6, where the processor is configured to execute the instructions to transmit a third graphical user interface to the mobile device, the third graphical user interface including solicitations for information regarding interests of the buyer.

10. The system of claim 6, where the processor is configured to execute the instructions to:

transmit a third graphical user interface to the mobile device of the buyer, the third graphical user interface configured to display to the buyer a solicitation for the buyer to express interest in a business associated with the selected group sales offer; and rank the business according a count of received expressions of interest in the business relative to other businesses subject to inquiries by the third graphical user interface.

11. A system, comprising:

a memory device configured to store processor executable instructions; and a processor communicatively coupled to the memory device, the processor configured to execute the instructions to:

receive data defining a group sales offer, where fulfillment of the group sales offer is conditioned upon acceptance of the group sales offer by a prescribed minimum number of buyer, and where the data defining the group sales offer includes geographic scope information associated with the group sales offer;

receive data defining a request for online content from a mobile device operated by a buyer;

receive data defining a current geographic location of the mobile device of the buyer from a global positioning system;

compare the current geographic location of the mobile device and geographic scope information associated with the group sales offer;

select for transmission to the mobile device of the buyer the online content and the group sales offer to the mobile device of the buyer based on the comparison;

transmit a first graphical user interface to the mobile device of the buyer, the first graphical user interface configured to display to the buyer the group sales offer, the first graphical user interface comprising a first user interface feature configured to receive, from the buyer, an acceptance of the group sales offer, and a second user interface feature configured to receive, from the buyer, a time limit for a prescribed minimum number of viewers to accept the group sales offer;

transmit a second graphical user interface to the mobile device of the buyer, the second graphical user interface visually depicting to the buyer a status of active group sales offers and closed group sales offers; and responsive to the prescribed minimum number of viewers not accepting the group sales offer by the time limit, automatically revoke the acceptance of the group sales offer by the buyer.

12. The system of claim 11, where the selection is also based on demographics of the buyer.

13. The system of claim 11, where the selection is also based on characteristics of online purchases previously conducted by the buyer.

14. The system of claim 11, where the processor is configured to execute the instructions to:

transmit a third graphical user interface to the mobile device of the buyer, the third graphical user interface configured to display to the buyer a solicitation for the buyer to express interest in a business associated with the selected group sales offer; and rank the business according a count of received expressions of interest in the business relative to other businesses subject to inquiries by a third graphical user interface.

* * * * *